US012600629B2

(12) United States Patent
Wittmann et al.

(10) Patent No.: US 12,600,629 B2
(45) Date of Patent: Apr. 14, 2026

(54) PARTICULATE CARBON MATERIALS AND METHOD FOR THE SEPARATION THEREOF

(71) Applicant: Suncoal Industries GmbH, Ludwigsfelde (DE)

(72) Inventors: Tobias Wittmann, Berlin (DE); Jacob Podschun, Berlin (DE)

(73) Assignee: Suncoal Industries GmbH, Ludwigsfelde (DE)

( * ) Notice: Subject to any disclaimer, the term of this patent is extended or adjusted under 35 U.S.C. 154(b) by 1312 days.

(21) Appl. No.: 17/299,564

(22) PCT Filed: Dec. 4, 2019

(86) PCT No.: PCT/EP2019/083695
§ 371 (c)(1),
(2) Date: Mar. 14, 2022

(87) PCT Pub. No.: WO2020/115143
PCT Pub. Date: Jun. 11, 2020

(65) Prior Publication Data
US 2022/0194798 A1 Jun. 23, 2022

(30) Foreign Application Priority Data
Dec. 4, 2018 (DE) ..................... 10 2018 220 946.4

(51) Int. Cl.
*C01B 32/05* (2017.01)
*B60C 1/00* (2006.01)
(Continued)

(52) U.S. Cl.
CPC ............ *C01B 32/05* (2017.08); *B60C 1/0016* (2013.01); *B60C 1/0025* (2013.01); *C08K 3/04* (2013.01);
(Continued)

(58) Field of Classification Search
CPC ..... C01B 32/05; B60C 1/0016; B60C 1/0025; C08K 3/04; C08L 21/00; C01P 2006/12;
(Continued)

(56) References Cited

U.S. PATENT DOCUMENTS 4,248,699 A 2/1981 Hukki
4,477,611 A 10/1984 Sperley
(Continued)

FOREIGN PATENT DOCUMENTS

AT 85234 B 11/1921
CA 522715 A 3/1956
(Continued)

OTHER PUBLICATIONS

International Search Report Corresponding to PCT/EP2019/083695 mailed Mar. 17, 2020.
(Continued)

*Primary Examiner* — Daniel C. Mccracken
(74) *Attorney, Agent, or Firm* — SERVILLA WHITNEY LLC

(57) ABSTRACT
The present invention relates to a process for separating particulate carbon materials and to the materials obtained thereby as well as to their use.

25 Claims, 5 Drawing Sheets

(51) Int. Cl.
  *C08K 3/04* (2006.01)
  *C08L 21/00* (2006.01)
(52) U.S. Cl.
  CPC ........... *C08L 21/00* (2013.01); *C01P 2006/12* (2013.01); *C01P 2006/80* (2013.01)
(58) Field of Classification Search
  CPC .............. C01P 2006/80; C01P 2004/61; C01P 2004/62; B03B 9/00; B03B 5/28; B07B 7/00; B07B 9/00
  See application file for complete search history.

(56) References Cited

U.S. PATENT DOCUMENTS

| | | | |
|---|---|---|---|
| 4,598,105 | A | 7/1986 | Weber et al. |
| 5,192,361 | A | 3/1993 | Schilling |
| 6,172,154 | B1 | 1/2001 | Brown et al. |
| 7,064,171 | B1 | 6/2006 | Halasa et al. |
| 7,671,126 | B1 | 3/2010 | Sandstrom et al. |
| 8,486,224 | B2 | 7/2013 | Öhman et al. |
| 8,815,052 | B2 | 8/2014 | Öhman et al. |
| 9,512,376 | B2 | 12/2016 | Peus |
| 9,902,816 | B2 | 2/2018 | Wittmann et al. |
| 10,119,031 | B2 | 11/2018 | Adrianus et al. |
| 10,415,184 | B2 | 9/2019 | Wittmann |
| 10,611,885 | B2 | 4/2020 | Wittmann et al. |
| 11,306,209 | B2 | 4/2022 | Wittmann et al. |
| 11,312,864 | B2 | 4/2022 | Wittmann et al. |
| 2002/0156177 | A1 | 10/2002 | Freund |
| 2005/0100502 | A1 | 5/2005 | Krauss et al. |
| 2007/0100058 | A1 | 5/2007 | Noguchi et al. |
| 2007/0151178 | A1 | 7/2007 | Baikerikar et al. |
| 2007/0187033 | A1 | 8/2007 | Shumacher et al. |
| 2007/0193669 | A1 | 8/2007 | Giannini et al. |
| 2008/0066839 | A1 | 3/2008 | Sandstrom et al. |
| 2008/0290317 | A1 | 11/2008 | Hille et al. |
| 2009/0099281 | A1 | 4/2009 | Sakurai et al. |
| 2010/0130639 | A1 | 5/2010 | Viola et al. |
| 2010/0204368 | A1 | 8/2010 | Benko et al. |
| 2010/0304141 | A1 | 12/2010 | Kamegawa et al. |
| 2011/0236816 | A1 | 9/2011 | Stanyschofsky et al. |
| 2012/0302664 | A1 | 11/2012 | Kamada |
| 2013/0046064 | A1 | 2/2013 | Herd et al. |
| 2013/0256113 | A1 | 10/2013 | Tumiatti et al. |
| 2013/0312472 | A1 | 11/2013 | Brehmer et al. |
| 2014/0116594 | A1 | 5/2014 | Miyazaki |
| 2014/0162873 | A1 | 6/2014 | Gu |
| 2014/0227325 | A1 | 8/2014 | Naskar et al. |
| 2014/0339467 | A1 | 11/2014 | Elliot et al. |
| 2015/0152255 | A1 | 6/2015 | Mlayah et al. |
| 2016/0024270 | A1 | 1/2016 | Schwaiger et al. |
| 2016/0230099 | A1 | 8/2016 | Hilli et al. |
| 2017/0226535 | A1 | 8/2017 | Tudman |
| 2017/0247255 | A1 | 8/2017 | Wittmann |
| 2018/0340074 | A1* | 11/2018 | Wittmann ............. B60C 1/0025 |
| 2020/0239697 | A1 | 7/2020 | Wittmann et al. |

FOREIGN PATENT DOCUMENTS

| | | | |
|---|---|---|---|
| CA | 700368 | A | 12/1964 |
| CA | 818607 | A | 7/1969 |
| CA | 2920702 | A1 | 2/2015 |
| CA | 3002724 | A1 | 5/2017 |
| CN | 102212219 | A | 10/2011 |
| CN | 103951858 | A | 7/2014 |
| CN | 106243427 | A | 12/2016 |
| DE | 28 29 977 | A1 | 1/1979 |
| DE | 102007056170 | A1 | 11/2008 |
| DE | 2007022840 | A1 | 12/2008 |
| DE | 2008050966 | A1 | 5/2009 |
| DE | 2011113825 | A1 | 3/2013 |
| DE | 102015015549.0 | | 11/2015 |
| DE | 10 2014 215 807 | A1 | 12/2015 |
| DE | 102014215807 | B3 | 12/2015 |
| DE | 102014215627 | A1 | 2/2016 |
| DE | 102016201801.9 | | 2/2016 |
| DE | 102016201801 | A1 | 5/2017 |
| EP | 1233042 | A2 | 8/2002 |
| EP | 1457308 | A1 | 9/2004 |
| EP | 2130893 | A2 | 12/2009 |
| EP | 2223928 | A1 | 9/2010 |
| EP | 2305750 | A1 | 4/2011 |
| EP | 2479223 | A1 | 7/2012 |
| EP | 2484434 | A1 | 8/2012 |
| EP | 2671632 | A2 | 12/2013 |
| EP | 2937388 | A1 | 10/2015 |
| EP | 2796561 | B1 | 7/2016 |
| EP | 3053929 | A1 | 8/2016 |
| EP | 3059287 | A1 | 8/2016 |
| EP | 2681296 | B1 | 4/2018 |
| JP | 2005075856 | A | 3/2005 |
| JP | 2010527879 | A | 8/2010 |
| JP | 2011006552 | A | 1/2011 |
| KR | 20140102807 | A | 8/2014 |
| RU | 2417172 | C2 | 4/2011 |
| RU | 2442806 | C2 | 2/2012 |
| WO | 2005100502 | A1 | 10/2005 |
| WO | 2006/031175 | A1 | 3/2006 |
| WO | 2006/038863 | A1 | 4/2006 |
| WO | 2008095589 | A1 | 8/2008 |
| WO | 2009/104995 | A1 | 8/2009 |
| WO | 2009127727 | A1 | 10/2009 |
| WO | 2009145784 | A1 | 12/2009 |
| WO | 2010006881 | A1 | 1/2010 |
| WO | 2010043562 | A1 | 4/2010 |
| WO | 2010112230 | A1 | 10/2010 |
| WO | 2011001315 | A1 | 1/2011 |
| WO | 2011013161 | A1 | 2/2011 |
| WO | 2012000033 | A1 | 1/2012 |
| WO | 2012168502 | A1 | 12/2012 |
| WO | 2014016344 | A1 | 1/2014 |
| WO | 2014096544 | A1 | 6/2014 |
| WO | 2014122163 | A1 | 8/2014 |
| WO | 2014180753 | A1 | 11/2014 |
| WO | 2015018944 | A1 | 2/2015 |
| WO | 2015025076 | A1 | 2/2015 |
| WO | 2015056757 | A1 | 4/2015 |
| WO | 2015097196 | A2 | 7/2015 |
| WO | 2016001490 | A1 | 1/2016 |
| WO | 2016/020383 | A1 | 2/2016 |
| WO | 2016207493 | A1 | 12/2016 |
| WO | 2017/085278 | A1 | 5/2017 |
| WO | 2017109672 | A1 | 6/2017 |
| WO | 2020115143 | A1 | 6/2020 |
| WO | 2021005230 | A1 | 1/2021 |

OTHER PUBLICATIONS

Written Opinion Corresponding to PCT/EP2019/083695 mailed Mar. 17, 2020.
Challenge Tech handmade tires catalogue (published 2015), 2 pages.
Continental Solid Tires catalogue (published 2018), 24 pages.
Michelin X Tweel Airless Radial Tire Family catalogue (published 2018), 8 pages.
Product information Ultrasil 360, Feb. 2018 (Evonik), 2 pages.
"ATSM International "Standard Test Method for Carbon Black—Total and External Surface Area by Nitrogen Adsorption"", Designation: D6556-09, Dec. 15, 2019.
"Dynamic Mechanical Properties of Passenger and Light Truck Tire Treads", NHTSA, Feb. 2010, 28 pages.
"How much does a tyre weigh?", (1 Aug. 8, 2015; Author: OPONEO. CO.UK, Adam Winter; http://www.oponeo.co. uk:80/tyre-article/how-muchdoes-a-tyre-weigh - capture from web.archive.org dated May 5, 2016).
"Hydroisotop GmbH, ‚Nachwachsende Rohstoffe, Sekundarbrennstoffe, Apr. 13, 2018".
"Hydrothermal Carbonization—1. Influence of Lignin in Lignocelluloses", Dec. 2011, Chemical Engineering & Technology 34(12) (DOI:10.1002/ceat.201100487).

(56)                References Cited

OTHER PUBLICATIONS

"IPC vol. 1 Sec B, 8th. ed.", article WIPO, International Patent Classification (core level), 2006 particular relevance: pp. 106-108.
"Lignin Filler for Tires (1957), 5 pages".
"Popular mechanics", 1914, vol. 22, No. 3, p. 402.
"Product information Ultrasil VN 3, Sep. 2018 (Evonik), 2 pages".
"The Pneumatic Tire", Feb. 2006, available from www.nhtsa.gov, 33 pages.
Brebu, Mihai , et al., "Thermal Degradation of Lignin—A Review", 2010, Cellulose Chern. Technol., 44(9), 353-363.
Brock, F. , et al., "Current Pretreatment Methods for AMS Radiocarbon Dating at the Oxford Radiocarbon Accelerator Unit (ORAU)", Radiocarbon, vol. 52, No. 1, pp. 103-112 (2010).
Chen, Xue , et al., "Effect of hydrothermal pretreatment on the structural changes of alkaline ethanol lignin from wheat straw", 2016, Scientific Reports 6:39354, DOI:1 0.1 038/srep39354, 1-9.
Chen, Xue , et al., "Effect of hydrothermal pretreatment on the structural changes of alkaline ethanol lignin from wheat straw", Scientific Reports, published Dec. 16, 2016, pp. 1-9, Springer Nature.
Clark, Samuel K., "Mechanics of Pneumatic Tires", 1971 , National Bureau of Standards Monograph 122, p. 360.
Czernik, J. , et al., "Preparation of Graphite Targets in the Gliwice Radiocarbon Laboratory for AMS 14C Dating", Radiocarbon, vol. 43, No. 2A, pp. 283-291 (2001).
Forrest, M.J. , "Rapra Review Reports, Report 139, Rubber Analysis—Polymers, Compounds and Products", 158 bages, vol. 12 issue No. 7.
Guy, L. , et al., "New Insights in the Dynamic Properties of Precipitated Silica Filled Rubber Using a New High Surface Silica", Raw Materials and Applications , 2009 particular relevance: pp. 383-384.
Hofmann, W. , "Rubber Technology Handbook", Dusseldorf, Spring, pp. 3 (1980).
Jiang, Guozhan , et al., "Effect of the temperature of the composition of lignin pyrolysis products", Energy Fuels, 2010, 24, 4470-4475.
Kaewsakul, W. , et al., "Optimization of Rubber Formulation for Silicareinforced Natural Rubber Compounds", Rubber Chemistry and Technology, vol. 86, No. 2, 2013, 17 pages.
Kang, Shimin , et al., "Characterization of Hydrochars Produced by Hydrothermal Carbonization of Lignin, Cellulose, d-Xylose, and Wood Meal", Ind. Eng. Chem. Res. 2012, 51, 26, 9023-9031.
Konecny, P. , et al., "Dynamic mechanical properties of filled styrene butadiene rubber compounds: comparison of tensile and shear data", Polym. Adv. Technol, 2007: 18:122-127.
Kostial, P. , et al., "The Chosen Aspects of Materials and Construction Influence on the Tire Safety in: Composites and Their Properties", Aug. 22, 2012 (DOI: 10.5772/48181), 34 pages.

Leister, G. , "Fahrzeugrader-Fahrzeugreifen", 2nd Ed., 2015, 175 pages.
Limper, Andreas , "Mixing of Rubber Compounds", Carl Hanser Verlag, 201 1 particular relevance: pp. 71-72.
Popa, V. I., et al., "Nanoparticles based on modified lignins with biocide properties", Cellulose Chemistry and Technology, vol. 45, Issue 3-4, pp. 221-226 (2011).
Ramsey, C.B. , "Bayesian Analysis of Radiocarbon Dates", Radiocarbon, vol. 51, No. 1,pp. 337-360 (2009).
Ramsey, C.B. , "Development of the Radiocarbon Calibration Program", Radiocarbon, vol. 43, No. 2A, pp. 355-363 (2003).
Ramsey, C.B. , et al., "Recent and Planned Developments of the Program OxCal", Radiocarbon, vol. 55, Issue 2, pp.720-730 (2013).
Reimer, p. J. , et al., "Intcal 13 and Marine13 Radiocarbon Age Calibration Curves 0-50,000 Years CAL BP", Radiocarbon, vol. 55, No. 4, p. 1869--1887 (2013).
Roethemeyer, F. , et al., "Rubber technology. Materials—Processing—Products", 3rd ed. Carl Hanser Verlag, pp. 1 (2013) (Abstract Only).
Ross, Kelly , et al., "Comparative analysis of pyrolysis products from a variety of herbaceous, Canadian crop residues", Wood Journal of Agricultural Sciences, 2011, 7(6), 763-776.
Sazanov, Yu. N., et al., "Thermochemistry of Lignin", Russian J. of Appl. Chemistry, 2010, vol. 83, No. 2, 175-194.
Stuiver, M. , et al., "Discussion. Reporting of 14 C Data", Radiocarbon, vol. 19, No. 3, pp. 355-363 (1977).
Teh, Swe Jyan, et al., "ZnCl2/NaCl-Catalysed Hydrothermal Carbonization of Glucose and Oil Palm Shell Fiber", Nanoscience and Nanotechnology Letters vol. 7, 611-615, 2015.
Wikberg, Hanne , et al., "Structural and morphological changes in Kraft lignin during hydrothermal carbonization", 2015, ACS Sustainable Chem. Eng.,3, 2737-2745.
Zhang, Bo , et al., "Reaction Kinetics of the Hydrothermal Treatment of Lignin", Appl. Biochem. Biotechnol., Mar. 2008, v. 147, pp. 119-131.
Zhao, J. , et al., "Thermal degradation of softwood lignin and hardwood lignin by TGFTIR and Py-GC/MS", Polymer Degradation and Stability, 2014, 108, 133-138.
ISO 37:2017(E) "Determination of tensile stress-strain properties".
ISO 4649:2017 "Determination of abrasion resistance using a rotating cylindrical drum device".
Textbook excerpt: S. Lowell et al., Characterization of porous solids and powders: surface area, pore size and density, Kluwer Academic Publishers, 2004.
"Study on Design Theory and Method of Binder-free Carbon and Its Complex Material", Editor Qicheng, Liu, National University of Defense Technology Press, p. 49, published on Jun. 30, 2002) [English machine translation].
1 Translation of PCT International Search Report in PCT /EP2019/ 083695 dated Mar. 17, 2020, 2 pages.

* cited by examiner

PARTICULATE CARBON MATERIALS AND METHOD FOR THE SEPARATION THEREOF

CROSS-REFERENCE TO RELATED APPLICATIONS

This application is the National Stage entry of PCT/EP2019/083695, filed on Dec. 4, 2019, which claims priority to Ser. No. DE 10 2018 220 946.4 filed on Dec. 4, 2018.

The present invention relates to a process for separating particulate carbon materials and to the materials obtained thereby as well as to the use thereof.

STATE OF THE ART

Particulate carbon materials are used in many applications. These range from use as black dyes to use as fillers in polymers, especially elastomers. Such carbon-based particulate materials can be, for example, carbon black, materials with a relatively high carbon content. Other particulate carbon materials are for example biomass based, such as lignin, for example products of hydrothermal carbonization (HTC) or precipitation. Such materials have a lower carbon content compared to carbon black, but show interesting properties due to a high degree of functionalization.

Such HTC-based particulate materials can be produced, for example, by processes as described in WO2016/020383, DE 10 2016 201 801 A1 or WO2017/085278. In the production of these HTC-based particulate materials, the adjustment of certain process parameters opens up the possibility of influencing in particular the particle size distribution to be obtained. The particle size distribution is usually measured by laser diffraction according to ISO 13320 or determined in the course of a multi-stage screening process, e.g. in a screening tower. In this way, the spatial extent of isolated grains is detected. Such grains are either agglomerates of much smaller primary particles, which cannot or cannot easily be separated from each other, or they are isolated primary particles.

If a particulate carbon material consists at least partly of agglomerates, i.e. primary particles that cannot be separated or cannot be separated easily, the size of these primary particles cannot be determined by measuring the particle size distribution. To account for the size of such agglomerated primary particles, the specific surface area of the particulate carbon material is measured. The specific surface area is an indirect measure of the average size of the primary particles which are isolated and not or not easily separable.

The specific surface area can be quantified, for example, by methods such as BET determinations or STSA determinations. In this case, the sum of the outer and inner surface is determined by a Brunauer, Emmett and Teller (BET) measurement, while only the outer surface is determined in a statistical thickness surface area (STSA) determination. Suitable determination methods are specified, for example, in ASTM D 6556-14.

It is known that the average size of the primary particles or the amount of the specific surface area has an influence on the properties of the materials produced using the particulate carbon materials, for example, rubber articles produced by compounding the particulate carbon material with elastomers with subsequent crosslinking. For example, the abrasion behavior of a rubber article is different depending on whether particulate carbon materials with higher or lower BET surface area are used. The situation is similar for mechanical properties, such as tensile strength. Higher BET surface area values correlate with higher tensile strength values and lower abrasion. Here, when using HTC-based particulate carbon materials, specific surface area values of at least 15 m²/g preferably $20^{m2/g}$ or more, preferably $30^{m2/g}$ or more, are often required to obtain high-quality rubber articles.

However, the possibilities described above for influencing the primary particle size—indirectly measured via the specific surface area—do not always allow desired high specific surface areas to be obtained within commercially acceptable limits when producing particulate carbon materials by a HTC or a precipitation.

Through studies on SEM images, it has now been surprisingly found that the particulate carbon materials obtained by means of the prior art do not consist of primary particles homogeneous with respect to their size.

For the separation of mixtures consisting of materials of different sizes, classification processes such as screening, air classifying or float-sink processes are suitable. By means of these processes, a separation of the fractions is carried out with regard to size (sieving process) or with regard to size and/or specific material density (wind sifting, float-sink process). DE 28 29 977 discloses, for example, a process for classifying cement. However, such processes are not suitable in the prior art for separating a particulate carbon material consisting of primary particles of different sizes into two batches that are more homogeneous with respect to their primary particle size, because the primary particles are—at least partially—present in agglomerates and thus classification methods aiming at a separation with regard to size cannot distinguish between large primary particles and agglomerates of substantially smaller primary particles of approximately the same size.

and the specific material density of primary particles of different sizes is the same.

Thus, no separation of the particulate carbon material into batches with different specific surface area can be found via prior art classification methods.

Thus, it would be desirable to be able to provide a process that allows selective separation into fractions of different specific surface areas. For example, fractions with a larger surface area could be separated from materials with a relatively small specific surface area, which could be used for more demanding applications (while the fraction with the smaller specific surface area would still remain suitable for other applications). Thus, particulate carbon materials with a more homogeneous distribution of specific surface area could also be obtained, which may be advantageous for certain applications. However, in particular, no easy-to-perform separation processes of this type are known.

TASK OF THE INVENTION

Thus, it is the object of the present invention to disclose such a process so as to provide the more homogeneous fractions of particulate carbon material described above.

BRIEF DESCRIPTION OF THE INVENTION

This task is solved by the method defined in claim 1 and the products defined in claims 7, 8 and 11, as well as the use defined in claim 10. Preferred embodiments and further aspects of the present invention result from the embodiments indicated in the further claims and the following detailed description.

DETAILED DESCRIPTION OF THE INVENTION

Figure 1:
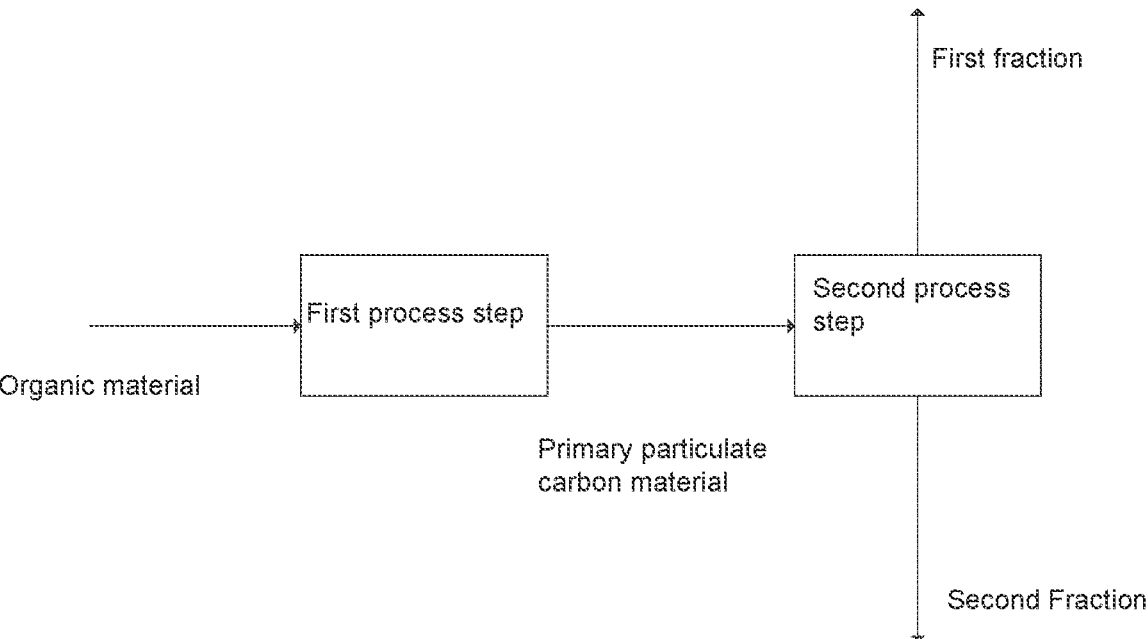
FIG. 1 schematically shows a possible embodiment of the process according to the invention.

The process of the present invention allows the simple and targeted fractionation of a particulate carbon material obtained from a precipitation or hydrothermal carbonization (hereinafter HTC) of a carbon-containing starting material, for example renewable raw materials such as wood, grass, straw or substances derived therefrom such as, for example, lignin, molasses, vinasse, sugar or starch. Embodiments of an HTC or a precipitation are known to the skilled person and, in particular, such particulate carbon materials can be produced, for example, by processes as described in WO2006031175 or WO2006038863 or WO2009104995 (precipitation) or WO2016/020383 or WO2017/085278 (HTC). It has been shown to be useful if the particulate carbon material obtained by the precipitation or the HTC has a STSA surface area of at least 5 $m^2/g$ preferably of at least 7 $m^2/g$, further preferably of at least 9 $m^2/g$.

The STSA surface area of the particulate carbon material prior to the separation according to the invention is typically in the range of from 5 to 200 $m^2/g$ such as from 10 to 150 $m^2/g$ or 10 to 100 $m^2/g$, preferably from 10-75 $m^2/g$ or 10 to 50 $m^2/g$ more preferably from 10 to 40 $m^2/g$ or 10 to 30 $m^2/g$. Such particulate carbon materials, in particular with the preferred STSA surface, are easily obtained by HTC processes or precipitations and are promising with respect to the possibilities of using the fractions to be obtained by the separation according to the invention. Typically, such particulate carbon materials contain a commercially relevant fraction of particulate carbon material with a higher STSA surface area than the average STSA of the particulate carbon material, suitable for use in high-value applications. At the same time, the STSA surface area of the fraction with the lower STSA surface area than the average STSA of the particulate carbon material, is still high enough so that commercial utilization is possible. For the particulate carbon materials, the values of STSA surface area and BET surface area are not far apart. Consequently, the particulate carbon materials are not porous or minimally porous. Advantageously, the BET surface area and the STSA surface area do not deviate from each other by more than 20%, preferably not more than 15%, particularly preferably not more than 10%.

The particulate carbon material further preferably exhibits a carbon content (based on ash-free dry matter) of 50 to 80 mass % (Ma %), more preferably 60 to less than 80 Ma %, Thus, the particulate carbon material is a material that differs from carbon blacks in carbon content. By producing this particulate carbon material by a HTC or precipitation, the lower carbon content compared to carbon blacks simultaneously ensures that there is a high content of functional groups on the particle surface. These can be beneficial for the subsequent use of the particulate carbon materials.

Surprisingly, it has been shown that it is possible to separate, by simple gravity separations, such a particulate carbon material into at least two fractions (First and Second Fractions) which differ significantly in terms of their specific surface area (STSA surface area). Thereby, one fraction shows a value of specific surface area (STSA surface area) higher than the value of the starting material (First Fraction), while the value of specific surface area (STSA surface area) of the other fraction (Second Fraction) is smaller or equal compared to the STSA surface area of the particulate carbon material.

The fractions obtained by the separation according to the invention are each more homogeneous than the particulate carbon material with respect to the distribution of the primary particle size. However, it has been shown that the separation has no significant effect on the particle size distribution (i.e., the size distribution of the agglomerates). For the fractions obtained after separation, this essentially corresponds to that of the particulate carbon material.

Since such gravity separations are both comparatively simple in terms of apparatus and not too complicated in terms of process control, fractions from a particulate carbon material that are suitable for more demanding quality applications can be obtained cost-effectively in this way without the need for more complex process adaptations in HTC or precipitation, for example. For example, fractions with significantly higher specific STSA surface area can be separated from easy-to-produce particulate carbon materials from HTC or precipitation with relatively low specific STSA surface area, which can be passed on at a higher price, for example. Advantageously, these fractions with significantly higher STSA surface area are used in applications in which, for example, tensile strength and/or abrasion are key parameters.

Since such gravity separations can be carried out in both liquid and gaseous phases, these separations can be easily combined with a system for HTC or precipitation. The basic process flow for this is shown in FIG. 1. The organic material, for example renewable raw materials such as wood, grass, straw or substances derived therefrom such as lignin, molasses, vinasse, sugar or starch, is predominantly dissolved in a first process step or is fed to it predominantly in solution and is converted in this step by HTC or precipitation into the particulate carbon material with the STSA of at least 5 $m^2/g$ according to the invention. Subsequently, the particulate carbon material is separated into at least two fractions in the second process step, gravity separation. In this context, the term liquid phase describes that the particulate carbon material is present in a liquid medium, for example in water or in an aqueous phase as used in HTC or precipitation. Similarly, the term gaseous phase describes that the particulate carbon material is present in a gaseous medium, for example air, nitrogen, superheated steam, carbon dioxide or mixtures of these gaseous media.

Figure 3A:
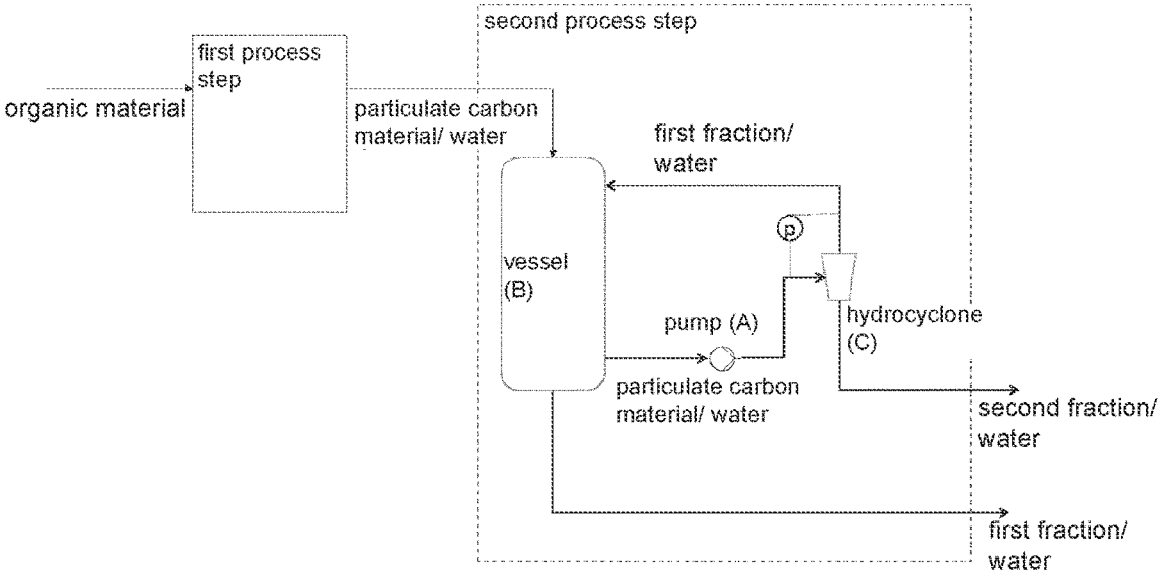
FIGS. 3a and 3b show schematic process diagrams with and without recirculation of a first fraction in possible process designs of the separation according to FIG. 1 using a cyclone.
Figure 3B:
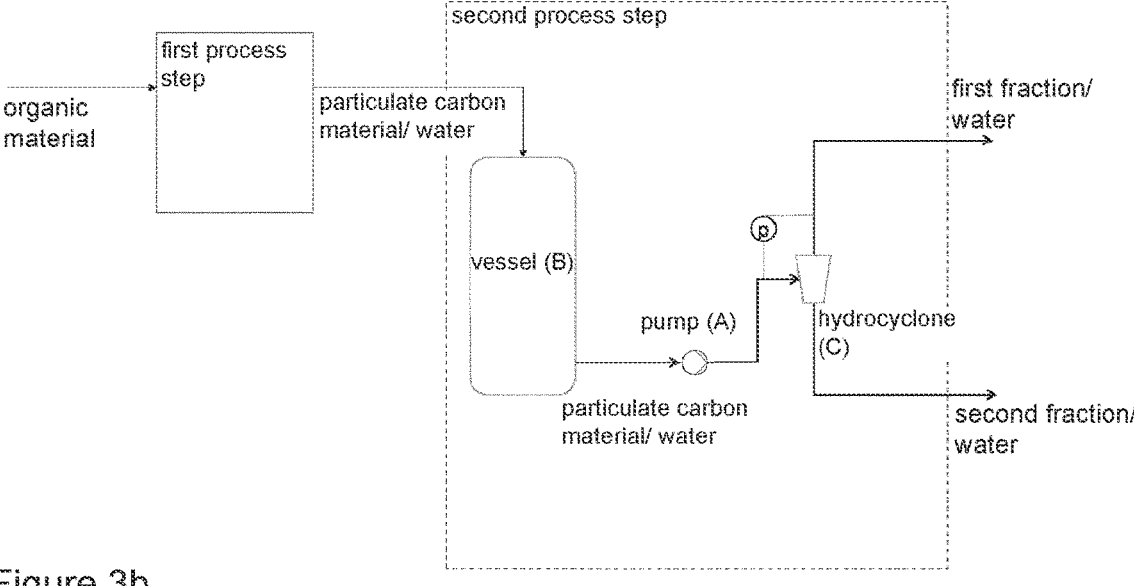

Devices for subjecting such phases to separation are well known to those skilled in the art. Examples include cyclones (hydrocyclones have been shown in accordance with the invention to be suitable for separating a particulate carbon material that is dispersed in a liquid medium such as, for example, water; Cyclones can also be used for a particulate carbon material which is fluidized with a gas, for example, air, nitrogen, superheated steam, carbon dioxide or mixtures, and introduced into the cyclone), centrifuges (centrifuges have also proved suitable according to the invention for separating a particulate carbon material dispersed in a liquid medium such as water) or classifiers (air classifiers have proved suitable for separating particulate carbon materials which are fluidized with, for example, air, nitrogen, superheated steam, carbon dioxide or mixtures and introduced into the classifier). FIGS. 3 *a* and *b* show suitable apparatuses for separation in a hydrocyclone. The particulate carbon material is recovered in a first process step from an organic material by precipitation or HTC and fed together with, for example, water to the second process step. There it is pumped, for example as a slurry with water, into the hydrocyclone, the Second Fraction can be separated and the portion not discharged as Second Fraction can be returned to the vessel containing the original particulate carbon material and from which the First Fraction is withdrawn after completion of the process (FIG. 3 *a*). Alternatively, in the second process stage, the particulate carbon material can also be fed as a slurry with water to the hydrocyclone, in which separation into the first fraction and second fraction then takes place. (FIG. 3 *b*). Both the First Fraction and the Second Fraction can be fed continuously or in a batch process to a subsequent process step. However, the present invention is not limited to the use of these specific devices. All devices that allow separation according to the basic principle disclosed here can be used, i.e. also other classifying devices, fluidized bed devices, centrifuges, etc.

Figure 2:
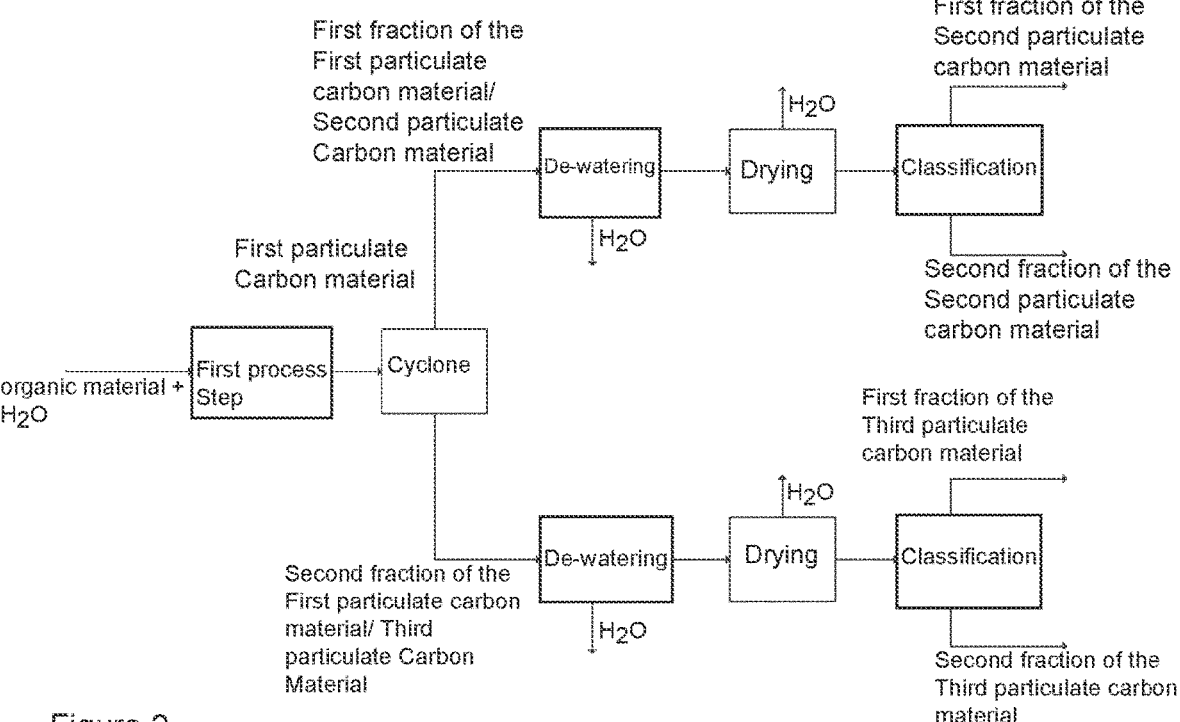
FIG. 2 shows a further embodiment in which, after a first separation in a cyclone, the two fractions obtained are dried and then each subjected to a further separation in a classifier.

According to the invention, different types of separation can also be combined. For example, since particulate carbon materials are obtained from HTC or precipitation in aqueous phase, separation can first be performed in a cyclone (for example, a hydrocyclone). Subsequently, the fractions obtained may be subjected to further separation treatments, independently of each other, in liquid phase or in gas phase. Thus, at least one of the fractions obtained can then be subjected to further separation in, for example, an air classifier after drying. This option is shown schematically in FIG. 2. The type of separation treatment is selected according to availability, the type of separation desired (if fractions with very different values for the specific STSA surface are desired or if the difference should not be so pronounced, if fractions of approximately the same size are desired or if the separation, possibly combined with extremely different values for the respective specific STSA surface, should result in at least one small but therefore very homogeneous fraction) and economic considerations.

In this context, it has been shown that in the case of liquid phase separation (i.e., basically using a slurry of the particulate carbon material in a liquid carrier, in particular an aqueous carrier), the proportion of particulate carbon material in the liquid phase is about 1 to 20% by mass (mass percent), preferably 5 to 15% by mass, in particular 6 to 10% by mass. Separation via a cyclone is then accomplished by suitably adjusting the pressure drop across the cyclone (for example, a hydrocyclone) by adjusting the feed and discharge rates. Preferably, the pressure drop is from 0.2 to 5 bar, more preferably from 0.8 to 4 bar, in particular 1.5 to 3 bar. In the case of separation in the gas phase (i.e. basically of an aerosol), the proportion of solids is about 0.01 to 0.5 kg/m$^3$, preferably 0.05 to 0.4 kg/m$^3$, in particular 0.1 to 0.3 kg/m$^3$.

Advantageously, the ratio of the D(50) of the first fraction to the D(50) of the second fraction is between 0.45 and 0.75, further preferably between 0.50 and 0.60. Advantageously, the ratio of the D(90) of the first fraction to the D(90) of the second fraction is between 0.5 and 0.8, further preferably between 0.6 and 0.7. Advantageously, the ratio of the D(98) of the First Fraction to the D(98) of the Second Fraction is between 0.9 and 1.1 more preferably between 0.95 and 1.05. These ratios can be easily achieved, as demonstrated in the examples, by adjusting the conditions (proportion of particulate carbon material, conditions in the cyclone/sifter, etc.). The values for the D(50), D(90) and D(98) are measured via laser diffraction according to ISO 13320. Furthermore, these advantageous ratios of the values for D(50), D(90), and D(98) make it clear that the particulate carbon material behaves significantly differently in a gravity separation than a conventional prior art material that would be separated into materials of different sizes with a gravity separation.

Advantageously, the ratio of the material density according to ISO 21687 of the first fraction to the material density of the second fraction is between 0.95 and 1.05, further preferably between 0.975 and 1.025. Once again, such ratios can be achieved by adapting the process parameters. Furthermore, it is again clear from the advantageous ratios of the material densities that the particulate carbon material behaves significantly differently in a gravity separation than a material which, based on the prior art, would be suitable for a gravity separation for separating materials of different densities.

It has been shown to be particularly advantageous if the separation in the gas phase follows a grinding or deagglomeration in a mill, for example a jet mill. For this purpose, the gas loaded with the particulate carbon material is first fed into a cyclone in which the Second Fraction (together with a small portion of the gas) is separated. The gas, which is now only loaded with the First Fraction, is then dedusted in a filter, where the First Fraction is separated. This combination of grinding with subsequent gravity separation applied to the particulate carbon material has the advantage that the ratios of D(90) and D(98) to each other given above make it possible to ensure that predominantly coarse grains are not removed in the cyclone and that the filter is charged with predominantly fine grains. This ensures that the filter effect is not impaired by an excess of fine-particle grains. Advantageously, therefore, a process for separating a particulate carbon feedstock, wherein the particulate carbon feedstock has been obtained by hydrothermal carbonization or precipitation of an organic feedstock, wherein the particulate carbon feedstock has an STSA surface area of at least 5$^{m2/g}$, following grinding into at least two fractions, wherein the first fraction is separated in a filter and has an STSA surface area greater than the STSA surface area of the particulate carbon material and the second fraction is separated in a cyclone and has an STSA surface area less than the STSA surface area of the particulate carbon material, the process comprising gravity separation of the particulate carbon material.

Furthermore, it has been shown to be particularly advantageous if the separation in the gas phase follows a drying process, for example in a fluidized bed dryer, a spray dryer, a flying bed dryer or a drum dryer. For this purpose, the gas emerging from the drying process and loaded with the particulate carbon material is first fed into a cyclone in which the Second Fraction (together with a small portion of the gas) is separated. The gas, which is now only loaded with the First Fraction, is then dedusted in a filter, where the First Fraction is separated. This combination of drying with subsequent gravity separation applied to the particulate carbon material has the advantage that the ratios of D(90) and D(98) to each other given above make it possible to ensure that predominantly coarse grains are not removed in the cyclone and that the filter is charged with predominantly fine grains. This ensures that the filter effect is not impaired by an excess of fine-particle grains. Advantageously, therefore, a process for separating a particulate carbon feedstock, wherein the particulate carbon feedstock has been obtained by hydrothermal carbonization or precipitation of an organic feedstock, wherein the particulate carbon feedstock has an STSA surface area of at least $5^{m2/g}$, following drying into at least two fractions, wherein the first fraction is separated in a filter and has an STSA surface area greater than the STSA surface area of the particulate carbon material and the second fraction is separated in a cyclone and has an STSA surface area less than the STSA surface area of the particulate carbon material, the process comprising gravity separation of the particulate carbon material.

The process according to the invention yields fractions that differ from the particulate carbon material with respect to their STSA surface area. However, as already explained and also shown in the examples, these fractions do not differ significantly from each other and from the particulate carbon material with respect to their particle size distribution. However, the respective fractions are more homogeneous with respect to their STSA surface area, since fractions with a different STSA surface area are separated. Thus, the present invention provides options to separate fractions with high STSA surface area from particulate carbon material with low STSA surface area, which can be used in more demanding applications. In contrast, fractions with low STSA surface area can be separated from starting materials with high STSA surface area, so that a further increase in STSA surface area is achieved for the remaining fraction.

These fractions and their STSA surface areas can be selectively obtained, since, taking into account the variants of process control disclosed herein, it is clear to the skilled person how; taking into account the STSA surface area of the particulate carbon material, the yield and/or STSA surface area of a target fraction can be obtained by the degree of separation. The fractions provided according to the invention, in particular the First Fraction, thereby preferably have an STSA surface area which is at least 5% larger, in embodiments at least 10% larger, and in some cases at least 20% larger, particularly preferably at least 30% larger than that of the particulate carbon material. At the same time, the First Fraction is more homogeneous with respect to its composition (in particular with respect to the distribution of the primary particle size) than the particulate carbon material. The fractions provided according to the invention, in particular the First Fraction, thereby preferably have an STSA surface area which is at most 200% larger, in embodiments at most 175% larger, and in some cases at most 150% larger than that of the particulate carbon material.

Preferably, the First Fraction has an STSA of at least 15 m²/g, further preferably of at least 20 m²/g, more preferably of at least 30 m²/g or more. Preferably, the first fraction is used in demanding applications. These are for example treads of tires, preferably pneumatic tires, conveyor belts where low abrasion is an essential requirement or for example sidewalls of tires, preferably pneumatic tires where tensile strength is an essential requirement.

Advantageously, the gravity separation can also be used as a method for adjusting the STSA of the First or the Second Fraction. This ensures that even if the STSA of the particulate carbon material varies over time, at least one of the fractions obtained via gravity separation has an STSA that varies only within a defined tolerance range. As an alternative to the STSA, the BET or the particle size distribution can also be used as an indirect measure of the STSA. For this purpose, for example, the STSA, the BET or the particle size distribution of the First Fraction or the Second Fraction is measured regularly and the process parameters of the gravity separation are adjusted so that the STSA, the BET or the particle size distribution of the First Fraction or the Second Fraction vary only within a defined tolerance range. In the case of gravity separation in the gas phase, this can be done by, for example, adjusting the speed of a classifier wheel or by adjusting the volume flow of the gas. In the case of gravity separation in the liquid phase, this can be done by, for example, adjusting the volume flow of the liquid or the pressure drop across the separation device (for example, the cyclone).

Advantageously, the tolerance band is a maximum of 110% and a minimum of 90% of the target value for the STSA, the BET or the particle size distribution of the First or Second Fraction.

Advantageously, the tolerance band is +5 m²/g and minimally −5 m²/g of the target value of the STSA or BET of the First or Second Fraction.

The process according to the invention can be designed such that the weight ratio of first to second fraction (each with respect to a separation operation) is in the range of 1:15 to 15:1, such as 1:10 to 10:1. Depending on the desired type of separation, this ratio can be varied, so separations are also possible in which this ratio is more in the range of 1:5 to 5:1, such as 1:2 to 2:1.

Also according to the invention is particulate carbon material with a homogeneous distribution of the primary particles, which is advantageously produced by the process according to the invention.

Such a particulate carbon material with a homogeneous distribution of primary particles is preferably characterized in that the ratio of the measured STSA to a calculated STSA is between 0.7 and 1.3, more preferably between 0.75 and 1.25, more preferably between 0.8 and 1.2 more preferably between 0.85 and 1.15, more preferably between 0.9 and 1.1.

The calculated STSA is calculated using the following formulas:

1. STSA surface area=sphere surface area/(sphere volume*material density)
2. Sphere surface=PI*measured sphere diameter^2
3. Sphere volume=⅙*PI*measured sphere diameter^3

Substituting 2. and 3. into 1. yields the following relationship:

STSA surface area=6/(measured sphere diameter*material density)

The measured sphere diameter is the average diameter of the smallest isolated primary particles, which can be seen on a SEM image.

Further, the present invention also provides the use defined in the claims, as well as elastomeric compounds and products made therefrom, such as tires, pneumatic tires, and other products made from such elastomeric compounds (in vulcanized and non-vulcanized form). However, the materials obtained or provided according to the invention can also be used in other material compounds, for example in thermoplastic materials or liquid materials, such as paints, ink compositions, etc. Here, the materials obtained or provided according to the invention can also contribute to improving the mechanical properties but can also be used for other purposes, such as coloring, providing chemical functionalities (due to the functional groups present in or on the particles), etc.

EXAMPLES

Example 1

A particulate carbon material with an STSA of 11.9 m²/g was obtained in a first process step in accordance with the process descriptions from WO2017/085278. The obtained particulate carbon material was separated into a first fraction and a second fraction by gravity separation in the gas phase in three different process steps in accordance with the principle sequence shown in FIG. 1.

The Hosokawa Alpine picoline air classifier with classifier wheel was used for gravity separation. The picosplit (20 ATP classifier) and picojet (40 AFG fluidized bed counter-jet mill) modules were used. The feed material was metered by means of the micro-metering device (PMD) associated with the picoline. The yields obtained and the STSA surface areas determined for the fractions are given in Table 1.

TABLE 1

| | Experiment 1 | | Experiment 2 | | Experiment 3 | |
|---|---|---|---|---|---|---|
| | Value | Index | Value | Index | Value | Index |
| Particulate carbon material | 11.9 m$^2$/g | A | 11.9 m$^2$/g | D | 11.9 m$^2$/g | G |
| First fraction | 24.5 m$^2$/g | B | 19.7 m$^2$/g | E | 13.3 m$^2$/g | H |
| Second fraction | 10.4 m$^2$/g | C | 10.5 m$^2$/g | F | 10.7 m$^2$/g | I |
| Yield First Fraction | 11% | | 15% | | 46% | |
| Yield Second Faction | 89% | | 85% | | 54% | |
| Classifier wheel speed [rpm] | 50000 | | 30000 | | 10000 | |

Figure 4:
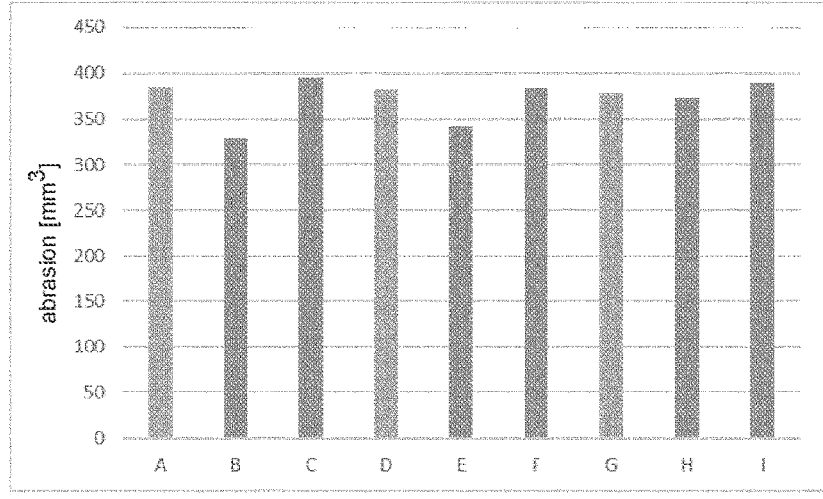
FIGS. 4 to 7 show abrasion and tensile strength values for compounds of the examples.
Figure 5:
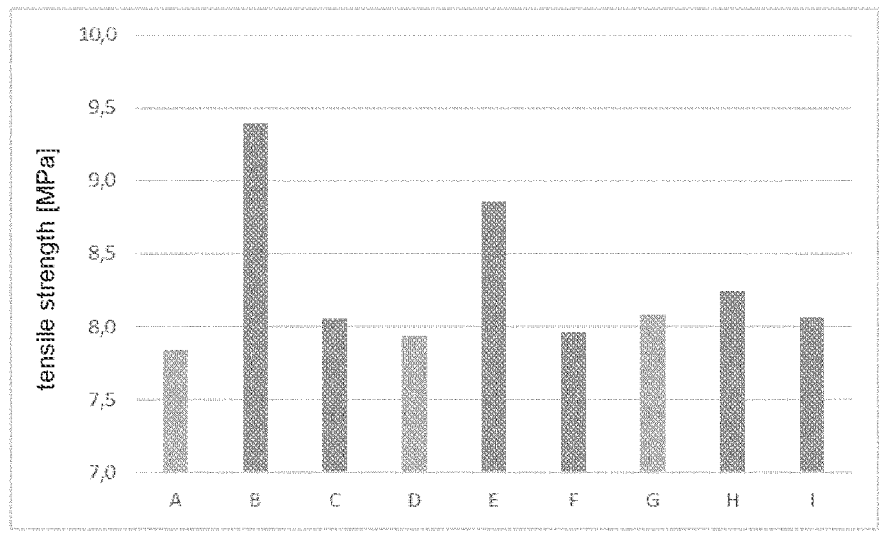

The particulate carbon material and the two fractions were then ground in a jet mill to a particle size of D99<10 μm. AH three materials were mixed into an SBR matrix as fillers. After vulcanization, the stress-strain curve was recorded in a tensile test. The results of the tensile strength are shown in FIG. 5. Furthermore, the abrasion was measured. The results are shown in FIG. 4.

The experiments impressively show that a valuable and substantial fraction with a significantly higher STSA surface area can be obtained from materials with a rather low STSA surface area (11.9 m$^2$/g) by a simple gravity separation process. In this context, the respective yield or the achievable STSA surface area can be specifically adjusted (see Table 1, experiments 1 to 3). From materials with an already high STSA surface area, a fraction with a very low STSA surface area can be separated according to the invention (i.e. particles with an STSA surface area that are actually considered insufficient for demanding elastomer compounding applications requiring high abrasion resistance and high tensile strength, see Table 2). The property profile of the fraction with increased STSA surface obtained by separating the fraction with low STSA surface is improved, since on the one hand a more homogeneous fraction is obtained in terms of STSA surface and on the other hand a fraction with poorer properties (in terms of application in elastomers) has been separated.

Example 2

A particulate carbon material with an STSA of 46 m$^2$/g was obtained in a first process step in accordance with the process descriptions from WO20171085278. The resulting particulate carbon material was separated into a first fraction and a second fraction by gravity separation in the liquid phase in an experiment in accordance with the principle procedure shown in FIG. 1 (see Table 2).

Another particulate carbon material with an STSA of 33 m$^2$/g was obtained in a first process step. The particulate carbon material was separated into a First Fraction and a Second Fraction in an experiment by gravity separation in the liquid phase. The STSA surface area of the obtained fractions and the respective yields are shown in Table 2.

TABLE 2

| | Experiment 1 | | Experiment 2 | |
|---|---|---|---|---|
| | Value | Index | Value | Index |
| Particulate carbon material | 46 m$^2$/g | J | 33 m$^2$/g | M |
| First fraction | 51 m$^2$/g | K | 35 m$^2$/g | N |
| Second fraction | 12 m$^2$/g | L | 4 m$^2$/g | O |
| Yield first fraction | 88% | | 92% | |
| Yield second fraction | 12% | | 8% | |

A cyclone was used for the gravity separation. The basic set-up of the apparatus is shown in FIG. 3 *a*. An organic material is converted into a particulate carbon material by HTC in the first process step and fed together with water to the second process step and buffered in the vessel (B). The mixture of water and particulate carbon material is continuously withdrawn from vessel (B) by pump (A) and separated into two fractions in hydrocyclone (C). The volume flow withdrawn from the vessel (B) by means of the pump (A) is adjusted so that the pressure drop (p) across the hydrocyclone (C) reached a certain value. The pressure drop is determined between the inlet and the outlet of the hydrocyclone. The concentration of particulate carbon material in the water ranged from 5 Ma. % to 10 Ma. % (average was 8.6 Ma. %).

Figure 6:
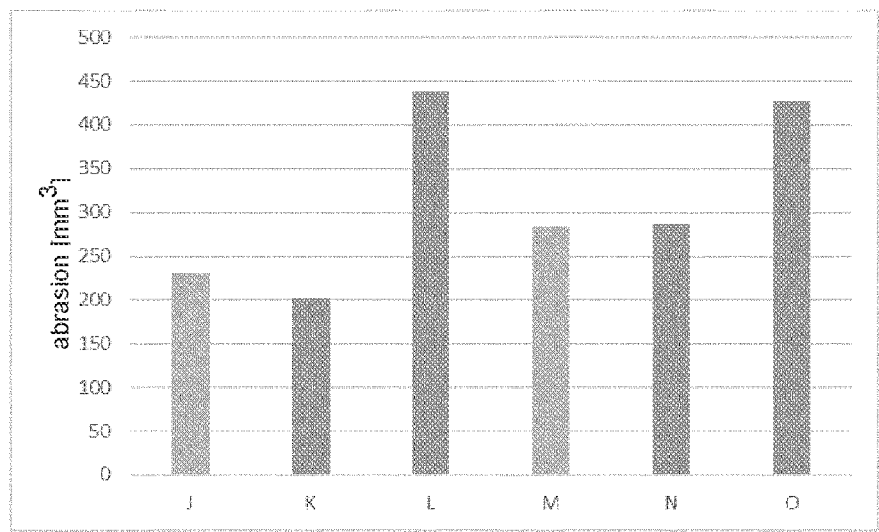
Figure 7:
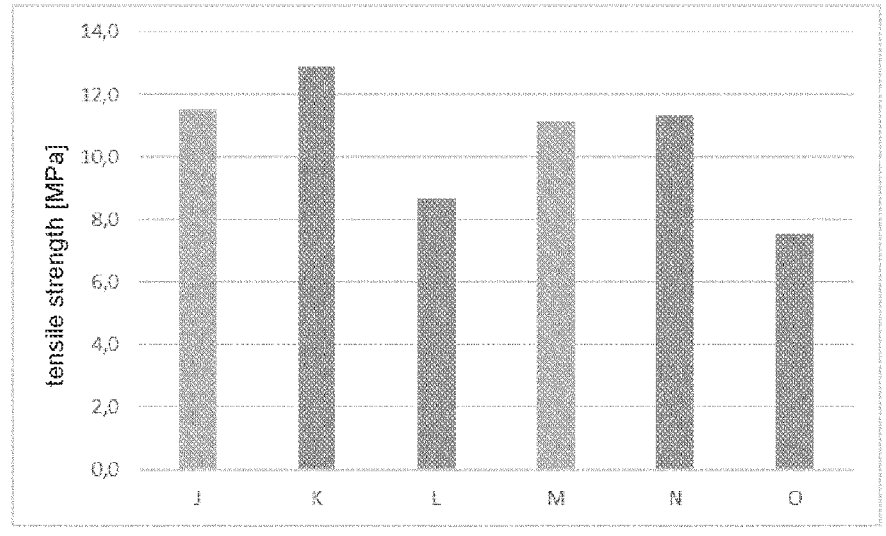

The particulate carbon material and the two fractions were then ground in a jet mill to a particle size of D99<10 μm. All three materials were mixed into an SBR matrix as fillers. After vulcanization, the stress-strain curve was recorded in a tensile test. The results of the tensile strength are shown in FIG. 6. Furthermore, the abrasion was measured. The results are shown in FIG. 7.

The compound for the elastomeric compounds of Examples 1 and 2 and the vulcanizates were prepared according to the following formulation by means of the following processes:
Recipe:

| Mixing component | Mixing ratio [phr] |
|---|---|
| SSBR 4526/2 | 103 |
| BR (CB24) | 25 |
| particulate carbon material | 80 |
| Si 69 | 7 |
| Zinc oxide | 2.5 |
| Stearic acid | 2.5 |
| 6PPD | 2 |
| TMQ | 2 |
| TDAE OIL | 5 |
| DPG | 2 |
| TBBS | 1.7 |
| Sulfur | 1.4 |

The mixture was prepared according to the following procedure:

The mixes were prepared by means of a Haake Rheomix 3000 measuring kneader (tangential rotor geometry) with a filling ratio of 70%. The mixing temperature was kept constant via the speed control. The mixing time was approx. 20 minutes.

Vulcanization was carried out at 160° C. according to the optimum t90 time determined in the rheometer plus one minute for each millimeter of sheet thickness.

Example 3

A particulate carbon material with an STSA of 13.1 m²/g was obtained in a first process step. The primary particulate carbon material was separated into a first fraction and a second fraction by gravity separation in the gas phase in a cyclone in an experiment. The particulate carbon material was first fed to a jet mill with classifier wheel and crushed. The 100 AFG jet mill was used (nozzle inserts 1.9 mm). D20 T36 GLATT TRS; slot; RA(I)=1.2 was used as classifier wheel. After the crushed material passed the classifier wheel, it was fed to a cyclone. From the cyclone, the First Fraction was discharged with the air stream and separated from the air stream via a filter, and the Second Fraction was separated directly in the cyclone. In this way, a First Fraction of 0.15 kg and a Second Fraction of 0.85 kg were obtained from 1 kg of particulate carbon material at an airflow rate of 6.3 m³/h. The results are shown below:

TABLE 3

|  | Experiment 1 | |
| --- | --- | --- |
|  | Value | Index |
| Particulate carbon materal | 13.1 m²/g | P |
| First fraction | 19.3 m²/g | Q |
| Second fraction | 12.0 m²/g | R |
| Yield first fraction | 15% | |
| Yield second fraction | 85% | |

For both fractions, the grain size distribution was determined by laser diffraction. This is shown in the following:

TABLE 4

|  | First fraction (Q) [μm] | Second fraction (R) [μm] | D(xx) First fraction/ D(xx) Second fraction [—] |
| --- | --- | --- | --- |
| D(10) | 0.683 | 0.994 | 0.69 |
| D(50) | 1.591 | 2.599 | 0.61 |
| D(90) | 3.522 | 5.503 | 0.64 |
| D(98) | 7.403 | 7.556 | 0.98 |
| D(99) | 8.383 | 8.209 | 1.02 |
| BET | 19.3 m²/g | 12.0 m²/g | |

This showed that by separating particulate carbon materials, despite the different values for specific surface area present after separation, the particle size distribution did not change significantly. Both fractions showed a good agreement of their particle size distribution.

Figure 8:
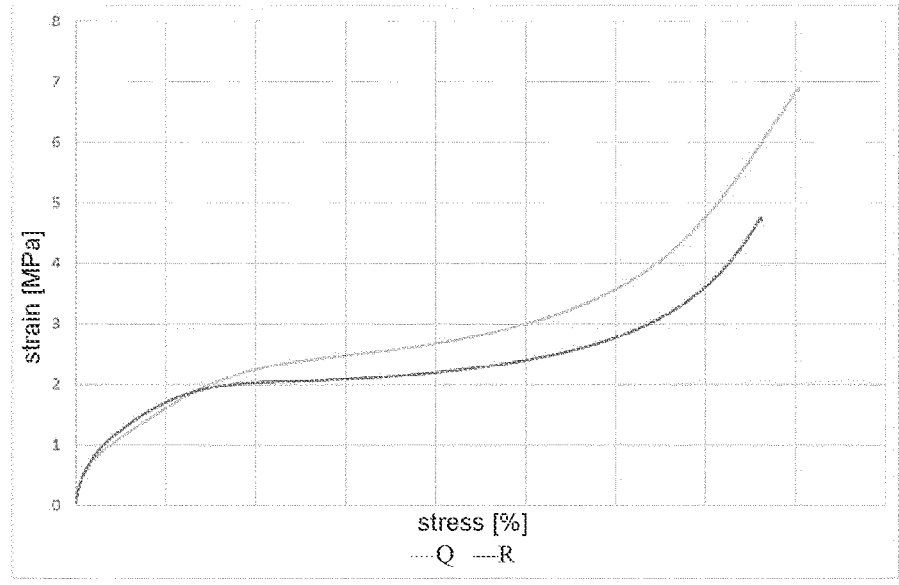
FIG. 8 shows tensile elongation curves of the compounds from example 4.

The two fractions thus obtained (first fraction and second fraction) were mixed into an EPDM matrix as fillers. After vulcanization, the stress-strain curve was recorded in a tensile test. The results are shown in FIG. 8.

Recipe

| Mixing component | Mixing ratio [phr] |
| --- | --- |
| Ceitan 8550C | 100.0 |
| Zinc oxide | 5.0 |
| Stearic add | 1.0 |
| Sunpar 2280 | 60.0 |
| particulate carbon material | 140.0 |
| PEG 4000 | 2.0 |
| Sulfur | 1.5 |
| TMTM 80 | 1.9 |
| MBTS | 0.9 |
| ZDBC 80 | 3.7 |

The mixtures were prepared according to the following procedure:

The blends were prepared using a N & P Type GK1.5E mixer (intermeshing rotor geometry) with a filling ratio of 70%, with a mixing temperature of 40° C. and a speed of 40 rpm.

Vulcanization was carried out at 160° C. according to the optimum t90 time determined in the rheometer plus one minute for each millimeter of sheet thickness.

Example 4

Several samples of a particulate carbon material, as well as the separated samples Q and R of Example 3 according to the method of the invention, were measured with respect to their STSA and analyzed by SEM. For each sample, the average diameter of the smallest isolated primary particles was determined on the SEM. From this, an STSA was then calculated. The measured STSA was related to the calculated STSA. The results are shown in Table 5:

TABLE 5

| Index | Example | Measured STSA [m²/g] | measured sphere diameter [μm] | calculated STSA [m²/g] | Measured STSA/ calculated STSA [—] | Comment |
| --- | --- | --- | --- | --- | --- | --- |
| A, D, G | 1 | 11.9 | 0.20 | 22.1 | 0.54 | particulate carbon material |
| B | 1, Attempt 1 | 24.5 | 0.20 | 22.1 | 1.11 | First fraction |
| C | 1, Attempt 1 | 10.4 | 0.40 | 11.0 | 0.94 | Second fraction |
| E | 1, Experiment 2 | 19.7 | 0.20 | 22.1 | 0.89 | First fraction |
| F | 1, Experiment 2 | 10.5 | 0.35 | 12.5 | 0.84 | Second fraction |
| H | 1, Experiment 3 | 13.3 | 0.20 | 22.1 | 0.60 | First fraction |

TABLE 5-continued

| Index | Example | Measured STSA [m²/g] | measured sphere diameter [μm] | calculated STSA [m²/g] | Measured STSA/ calculated STSA [—] | Comment |
|-------|---------|---------------------|-------------------------------|------------------------|------------------------------------|---------|
| I | 1, Experiment 3 | 10.7 | 0.25 | 17.6 | 0.61 | Second fraction |
| P | 3 | 13.1 | 0.22 | 20.1 | 0.65 | particulate carbon material |
| R | 3 | 12.0 | 0.30 | 14.6 | 0.82 | Second fraction |
| Q | 3 | 19.3 | 0.23 | 19.4 | 0.99 | First fraction |

Here it can be seen that for the samples according to the invention in comparison with the starting materials, there is a better correlation of the calculated and measured surface values. This again shows the uniformity of the materials obtained in accordance with the method of the present invention.

The invention claimed is:

1. A process for separating a starting particulate carbon material, the carbon material having been obtained by hydrothermal carbonization or precipitation of an organic feedstock the process comprising:
   conducting gravity separation of the starting particulate carbon material to form at least two fractions including:
   a first fraction and a second fraction, wherein
   the starting particulate carbon material has a starting statistical thickness surface area (STSA) of at least 5 m²/g,
   the first fraction has a first statistical thickness surface area (STSA) that is greater than the starting STSA of the starting particulate carbon material, and
   the second fraction has second statistical thickness surface area (STSA) that is smaller than the starting STSA of the starting particulate carbon material.

2. The process of claim 1, wherein the gravity separation takes place in liquid phase or in gas phase.

3. The process of claim 1, wherein the gravity separation is used to adjust the first STSA of the first fraction or the second STSA of the second fraction.

4. The process of claim 1, wherein the first STSA of the first fraction is at least 5% greater than the starting STSA of the starting particulate carbon material.

5. The process of claim 1, wherein a weight ratio of the first fraction to the second fraction is in a range of 1:10 to 10:1.

6. The process of claim 1, wherein the gravity separation is carried out in an air classifier or cyclone.

7. The process of claim 1, wherein the starting particulate carbon material has a carbon content of from 55 Ma % to less than 80 Ma %.

8. A particulate carbon material having a homogeneous distribution of primary particles wherein a ratio of a measured statistical thickness surface area (STSA) to a calculated statistical thickness surface area (STSA) is between 0.7 and 1.3.

9. The particulate carbon material having a homogeneous distribution of claim 8, wherein the measured STSA is at least 5% greater than a starting statistical thickness surface area (STSA) of a starting particulate carbon material, and/or wherein a first fraction of a gravity-separated starting particulate carbon material has a first statistical thickness surface area (STSA) at least 50% greater than a second statistical thickness surface area (STSA) of a second fraction of the gravity-separated starting particulate carbon material.

10. The particulate carbon material having a homogeneous distribution according to claim 8, wherein the measured STSA is at least 15 m²/g.

11. The particulate carbon material having a homogeneous distribution of claim 10, wherein the measured STSA is at least 20 m²/g.

12. The particulate carbon material having a homogeneous distribution of claim 11, wherein the measured STSA is at least 30 m²/g.

13. A rubber product comprising the particulate carbon material having a homogeneous distribution according to claim 8 and a rubber ingredient.

14. A method of utilizing the particulate carbon material having a homogeneous distribution according to claim 8, the method comprising mixing the particulate carbon material with an ingredient, wherein the particulate carbon material is effective as a filler in elastomers, thermoplastics, paints, and/or lacquers.

15. The method of claim 14, wherein the particulate carbon material has a statistical thickness surface area (STSA) of at least 15 m²/g.

16. The method of claim 14, wherein the particulate carbon material is mixed with a rubber ingredient to form a tread or sidewall of a pneumatic tire.

17. A particulate carbon material of a first fraction having a homogeneous distribution of primary particles being obtainable by a process for separating a starting particulate carbon material, the starting particulate carbon material having been obtained by hydrothermal carbonization or precipitation of an organic feedstock, the process comprising conducting gravity separation of the starting particulate carbon material to form at least two fractions including the first fraction and a second fraction,
   wherein the starting particulate carbon material has a starting statistical thickness surface area (STSA) of at least 5 m²/g, the particulate carbon material of the first fraction has a first statistical thickness surface area (STSA) that is at least 5% greater than the starting STSA of the starting particulate carbon material, and the second fraction has a second statistical thickness surface area (STSA) that is smaller than the starting STSA of the starting particulate carbon material.

18. The particulate carbon material of the first fraction according to claim 17, wherein the first statistical thickness surface area (STSA) of the particulate carbon material of the first fraction is at least 50% greater than the second statistical thickness surface area (STSA) of the second fraction.

19. The particulate carbon material of the first fraction according to claim 17, wherein the first statistical thickness surface area (STSA) is at least 15 m²/g.

20. The particulate carbon material of the first fraction of claim 19, wherein the first statistical thickness surface area (STSA) is at least 20 m²/g.

US 12,600,629 B2

15

21. The particulate carbon material of the first fraction of claim 20, wherein the first statistical thickness surface area (STSA) is at least 30 m$^2$/g.

22. A rubber product comprising the particulate carbon material of the first fraction according to claim 17 and a rubber ingredient.

23. A method of utilizing the particulate carbon material of the first fraction according to claim 17, the method comprising mixing the particulate carbon material of the first fraction with an ingredient, wherein the particulate carbon material of the first fraction is effective as a filler in elastomers, thermoplastics, paints, and/or lacquers.

24. The method of claim 23, wherein the first statistical thickness surface area (STSA) is at least 15 m$^2$/g.

25. The method of claim 23, wherein the particulate carbon material of the first fraction is mixed with a rubber ingredient to form a tread or sidewall of a pneumatic tire.

\* \* \* \* \*